United States Patent
Zhang et al.

(10) Patent No.: US 12,546,872 B2
(45) Date of Patent: Feb. 10, 2026

(54) SENSOR ALIGNMENT

(71) Applicant: Pony AI Inc., Grand Cayman (KY)

(72) Inventors: Yubo Zhang, Los Gatos, CA (US); Pingfan Meng, San Bruno, CA (US)

(73) Assignee: Pony AI Inc., Grand Cayman (KY)

( * ) Notice: Subject to any disclaimer, the term of this patent is extended or adjusted under 35 U.S.C. 154(b) by 419 days.

(21) Appl. No.: 18/175,501

(22) Filed: Feb. 27, 2023

(65) Prior Publication Data
US 2023/0213636 A1    Jul. 6, 2023

Related U.S. Application Data

(63) Continuation of application No. 17/013,090, filed on Sep. 4, 2020, now Pat. No. 11,592,539.

(51) Int. Cl.
| | |
|---|---|
| *G01S 7/497* | (2006.01) |
| *G01S 17/42* | (2006.01) |
| *G01S 17/86* | (2020.01) |
| *G01S 17/931* | (2020.01) |
| *G06T 7/33* | (2017.01) |

(52) U.S. Cl.
CPC ............ *G01S 7/4972* (2013.01); *G01S 17/42* (2013.01); *G01S 17/86* (2020.01); *G01S 17/931* (2020.01); *G06T 7/337* (2017.01); *G06T 2207/10028* (2013.01); *G06T 2207/30252* (2013.01)

(58) Field of Classification Search
CPC ...... G01S 7/4972; G01S 17/86; G01S 17/931; G06T 2207/10028; G06T 7/337; G06T 2200/04; G06T 7/344; G06T 2207/30252
See application file for complete search history.

(56) References Cited

U.S. PATENT DOCUMENTS

| | | | |
|---|---|---|---|
| 9,485,417 B2 | 11/2016 | Campbell et al. | |
| 11,210,845 B2 | 12/2021 | Meng et al. | |
| 2011/0246165 A1* | 10/2011 | Dai | A61F 9/00821 |
| | | | 600/587 |

(Continued)

FOREIGN PATENT DOCUMENTS

| | | | | |
|---|---|---|---|---|
| CN | 106725966 A | * | 5/2017 | ............. A61C 19/04 |
| CN | 107703377 A | * | 2/2018 | ............. G01R 31/00 |

*Primary Examiner* — Kee M Tung
*Assistant Examiner* — Thang Gia Huynh
(74) *Attorney, Agent, or Firm* — Sheppard, Mullin, Richter & Hampton LLP; Xin Xie

(57) ABSTRACT

Described herein are systems, methods, and non-transitory computer readable media for performing an alignment between a first vehicle sensor and a second vehicle sensor. Two-dimensional (2D) data indicative of a scene within an environment being traversed by a vehicle is captured by the first vehicle sensor such as a camera or a collection of multiple cameras within a sensor assembly. A three-dimensional (3D) representation of the scene is constructed using the 2D data. 3D point cloud data also indicative of the scene is captured by the second vehicle sensor, which may be a LiDAR. A 3D point cloud representation of the scene is constructed based on the 3D point cloud data. A rigid transformation is determined between the 3D representation of the scene and the 3D point cloud representation of the scene and the alignment between the sensors is performed based at least in part on the determined rigid transformation.

17 Claims, 7 Drawing Sheets

(56) References Cited

U.S. PATENT DOCUMENTS

| | | | |
|---|---|---|---|
| 2016/0037177 A1* | 2/2016 | Park | H04N 19/182 |
| | | | 375/240.25 |
| 2016/0173785 A1 | 6/2016 | Campbell et al. | |
| 2017/0365068 A1 | 12/2017 | Tan et al. | |
| 2019/0011538 A1 | 1/2019 | Schwarz et al. | |
| 2021/0082148 A1 | 3/2021 | Parkison et al. | |

* cited by examiner

SENSOR ALIGNMENT

CROSS REFERENCE TO RELATED APPLICATIONS

This application is a continuation application of U.S. patent application Ser. No. 17/013,090, filed Sep. 4, 2020, the content of which is hereby incorporated by reference in their entirety.

TECHNICAL FIELD

The present invention relates generally to sensor alignment and calibration, and more particularly, in some embodiments, to alignment/calibration of a first vehicle sensor to a second vehicle sensor.

BACKGROUND

On-board sensors in a vehicle, such as an autonomous vehicle, supplement and bolster the vehicle's field-of-view (FOV) by providing continuous streams of sensor data captured from the vehicle's surrounding environment. Sensor data is used in connection with a diverse range of vehicle-based applications including, for example, blind spot detection, lane change assisting, rear-end radar for collision warning or collision avoidance, park assisting, cross-traffic monitoring, brake assisting, emergency braking, and automated distance control. In addition, the sensor data can be used to perform a variety of machine learning tasks that support the above-described vehicle-based applications such as object detection, semantic segmentation, instance segmentation, and the like.

On-board sensors can include, for example, cameras, light detection and ranging (LiDAR)-based systems, radar-based systems, Global Positioning System (GPS) systems, sonar-based sensors, ultrasonic sensors, inertial measurement units (IMUs), accelerometers, gyroscopes, magnetometers, and far infrared (FIR) sensors. Sensor data may include image data, reflected laser data, or the like. Often, combining (e.g., fusing) the sensor data from different sensors can provide a more powerful dataset that results in better performance, more accurate calculations, etc. when performing computational tasks related to autonomous vehicle operation. In order to successfully fuse sensor data from different sensors, the sensors must be aligned/calibrated with one another. Discussed herein are technical solutions that address technical drawbacks associated with convention sensor alignment/calibration systems.

SUMMARY

In an example embodiment, a computer-implemented method for performing an alignment between a first vehicle sensor and a second vehicle sensor is disclosed. The computer-implemented method includes receiving two-dimensional (2D) data captured by the first vehicle sensor, where the 2D data is indicative of a scene within an environment being traversed by a vehicle, and constructing a three-dimensional (3D) representation of the scene based at least in part on the 2D data. The method further includes receiving 3D point cloud data captured by the second vehicle sensor, where the 3D point cloud data is indicative of the scene, and constructing a 3D point cloud representation of the scene based at least in part on the 3D point cloud data. The method further includes determining a rigid transformation between the 3D representation of the scene and the 3D point cloud representation of the scene and performing the alignment between the first vehicle sensor and the second vehicle sensor based at least in part on the determined rigid transformation.

In an example embodiment, the first vehicle sensor is a camera, the second vehicle sensor is a LiDAR, the 2D data includes image data captured by the camera from a plurality of camera poses as the vehicle traverses the environment, and the 3D point cloud data includes LiDAR data points captured by a plurality of scans of the LiDAR as the vehicle traverses the environment.

In an example embodiment, determining the rigid transformation includes determining a transformation matrix that provides a best match between the 3D representation of the scene and the 3D point cloud representation of the scene.

In an example embodiment, the computer-implemented method for performing an alignment between a first vehicle sensor and a second vehicle sensor further includes determining a scaling factor between the 3D representation of the scene and the 3D point cloud representation of the scene, where the alignment between the first vehicle sensor and the second vehicle sensor is performed further based at least in part on the determined scaling factor.

In an example embodiment, determining the scaling factor includes receiving a first set of 3D point cloud data points captured during a first scan performed by the second vehicle sensor, receiving a second set of 3D point cloud data points captured during a second scan performed by the second vehicle sensor, and orienting the first set of 3D point cloud data points to the second set of 3D point cloud data points.

In an example embodiment, the first scan occurs while the vehicle is in a first location corresponding to a first pose with respect to the environment and the second scan occurs while the vehicle is in a second location corresponding to a second pose with respect to the environment, and orienting the first set of 3D point cloud data points to the second set of 3D point cloud data points includes orienting the first set of 3D point cloud data points to the second set of 3D point cloud data points based at least in part a real-world orientation of the first pose with respect to the second pose.

In an example embodiment, determining the scaling factor further includes determining an actual distance between the first location and the second location after orienting the first set of 3D point cloud data points to the second set of 3D point cloud data points, determining a relative distance between the first location and the second location based at least in part on the 3D representation of the scene constructed from the 2D data, and determining the scaling factor as the ratio of the actual distance to the relative distance.

In an example embodiment, a system for performing an alignment between a first vehicle sensor and a second vehicle sensor is disclosed. The system includes at least one processor and at least one memory storing computer-executable instructions. The at least one processor is configured to access the at least one memory and execute the computer-executable instructions to perform a set of operations including receiving two-dimensional (2D) data captured by the first vehicle sensor, where the 2D data is indicative of a scene within an environment being traversed by a vehicle, and constructing a three-dimensional (3D) representation of the scene based at least in part on the 2D data. The set of operations further includes receiving 3D point cloud data captured by the second vehicle sensor, where the 3D point cloud data is indicative of the scene, and constructing a 3D point cloud representation of the scene based at least in part on the 3D point cloud data. The set of operations further includes determining a rigid transformation between the 3D representation of the scene and the 3D point cloud representation of the scene and performing the alignment between the first vehicle sensor and the second vehicle sensor based at least in part on the determined rigid transformation.

The above-described system is further configured to perform any of the operations/functions and may include any of the additional features/aspects of example embodiments of the invention described above in relation to example computer-implemented methods of the invention.

In an example embodiment, a computer program product for performing an alignment between a first vehicle sensor and a second vehicle sensor is disclosed. The computer program product includes a non-transitory computer-readable medium readable by a processing circuit. The non-transitory computer-readable medium stores instructions executable by the processing circuit to cause a method to be performed. The method includes receiving two-dimensional (2D) data captured by the first vehicle sensor, where the 2D data is indicative of a scene within an environment being traversed by a vehicle, and constructing a three-dimensional (3D) representation of the scene based at least in part on the 2D data. The method further includes receiving 3D point cloud data captured by the second vehicle sensor, where the 3D point cloud data is indicative of the scene, and constructing a 3D point cloud representation of the scene based at least in part on the 3D point cloud data. The method further includes determining a rigid transformation between the 3D representation of the scene and the 3D point cloud representation of the scene and performing the alignment between the first vehicle sensor and the second vehicle sensor based at least in part on the determined rigid transformation The above-described computer program product is further configured to perform any of the operations/functions and may include any of the additional features/aspects of example embodiments of the invention described above in relation to example computer-implemented methods of the invention.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

DETAILED DESCRIPTION

Figure 1:
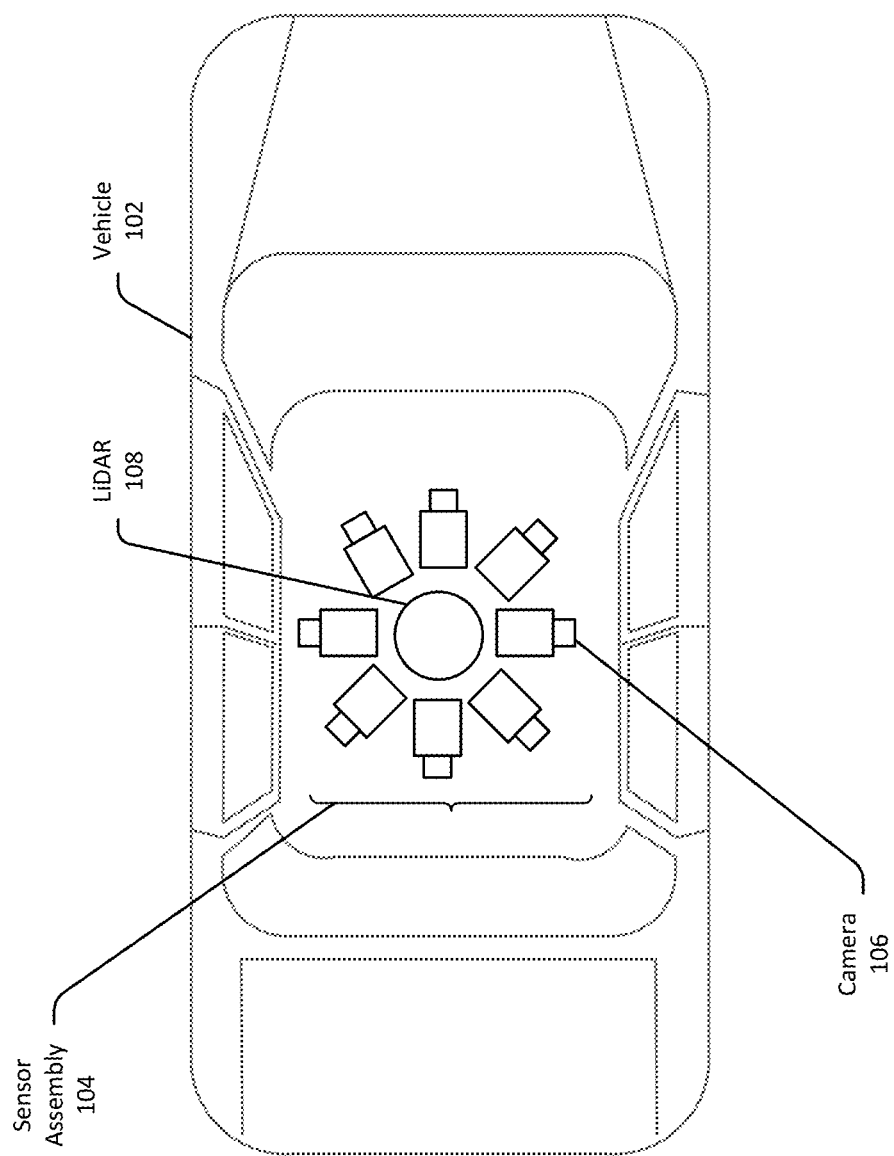
FIG. 1 is an aerial view of a sensor assembly in accordance with an example embodiment of the invention.

In the following description, certain specific details are set forth in order to provide a thorough understanding of various embodiments of the invention. However, one skilled in the art will understand that the invention may be practiced without these details. Moreover, while various embodiments of the invention are disclosed herein, many adaptations and modifications may be made within the scope of the invention in accordance with the common general knowledge of those skilled in this art. Such modifications include the substitution of known equivalents for any aspect of the invention in order to achieve the same result in substantially the same way.

Unless the context requires otherwise, throughout the present specification and claims, the word "comprise" and variations thereof, such as, "comprises" and "comprising" are to be construed in an open, inclusive sense, that is as "including, but not limited to." Recitation of numeric ranges of values throughout the specification is intended to serve as a shorthand notation of referring individually to each separate value falling within the range inclusive of the values defining the range, and each separate value is incorporated in the specification as it were individually recited herein. Additionally, the singular forms "a," "an" and "the" include plural referents unless the context clearly dictates otherwise. The phrases "at least one of," "at least one selected from the group of," or "at least one selected from the group consisting of," and the like are to be interpreted in the disjunctive (e.g., not to be interpreted as at least one of A and at least one of B).

Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment, but may be in some instances. Furthermore, the particular features, structures, or characteristics may be combined in any suitable manner in one or more embodiments.

In general, a vehicle (e.g., an autonomous vehicle) can have a myriad of sensors onboard the vehicle. Such sensors can be disposed on an exterior or in an interior of a vehicle and can include, without limitation, LiDAR sensors, radars, cameras, GPS receivers, sonar-based sensors, ultrasonic sensors, IMUs, accelerometers, gyroscopes, magnetometers, FIR sensors, and so forth. Such sensors play a central role in the functioning and operation of an autonomous vehicle. For example, LiDARs can be utilized to detect objects (e.g., other vehicles, road signs, pedestrians, buildings, etc.) in an environment around a vehicle. LiDARs can also be utilized to determine relative distances between objects in the environment and between objects and the vehicle. As another non-limiting example, radars can be utilized in connection with collision avoidance, adaptive cruise control, blind spot detection, assisted parking, and other vehicle applications. As yet another non-limiting example, cameras can be utilized to recognize, interpret, and/or identify objects captured in images or visual cues of the objects. Cameras and other optical sensors can capture image data using charge coupled devices (CCDs), complementary metal oxide semiconductors (CMOS), or similar elements. Data collected from these sensors can be processed and used, as inputs, to algorithms configured to make various autonomous driving decisions including decisions relating to when and how much to accelerate, decelerate, change direction, or the like.

In various example embodiments of the invention, the myriad of sensors previously described (e.g., LiDARs, radars, cameras, etc.) provide continuous streams of sensor data that are provided as input to algorithms that perform complex calculations in order to facilitate a multitude of operations required for safe autonomous vehicle operation such as object detection, object classification, object tracking, collision avoidance, vehicle navigation, vehicle acceleration and deceleration, and the like. Often, combining (e.g., fusing) the sensor data from different sensors can provide a more powerful dataset that results in better performance, more accurate calculations, etc. when performing computational tasks related to autonomous vehicle operation. In order to successfully fuse sensor data from different sensors, the sensors must be aligned/calibrated with one another. Sensor alignment/calibration, however, can be a time-consuming process. Further, sensor alignment/calibration between sensors that capture data corresponding to different dimensionalities can be a particularly time-intensive task.

Various embodiments of the invention overcome technical problems specifically arising in the realm of computer-based technology, and more specifically, in the realm of autonomous vehicle technology. In particular, example embodiments of the invention provide technical solutions that improve the efficiency of sensor alignment/calibration. These technical solutions are provided in the form of systems, methods, non-transitory computer-readable media, techniques, and methodologies for performing an alignment between a first vehicle sensor and a second vehicle sensor using respective sensor data captured by the sensors and 3D scene representations constructed using the respective sensor data. In this manner, the sensor alignment/calibration can be achieved in a more efficient and less time-intensive manner because sensor data captured during vehicle operation can be used to perform the sensor alignment/calibration.

In an example embodiment, the first vehicle sensor may be a camera or a collection of cameras forming part of a sensor assembly. In an example embodiment, the second vehicle sensor may be a LiDAR sensor, which may also form part of the sensor assembly with the camera(s). The camera may be configured to periodically capture 2D image data at a designated frame capture rate. The 2D data may capture image data of a scene in an environment being traversed by a vehicle from different camera poses. The LiDAR may be configured to periodically scan the vehicle's environment by transmitting pulses of light at periodic intervals as the LiDAR moves along the scan path. The LiDAR sensor may be further configured to measure differences in return times and wavelengths for the light that is reflected back to the LiDAR and generate 3D point cloud data (a set of data points in space) representative of a target object that it has illuminated with light during its scan path.

In example embodiments, a camera provided, for example, on an exterior of a vehicle such as an autonomous vehicle may capture a set of 2D images of a scene in an environment being traversed by the vehicle. A 3D representation of the scene may then be constructed using the set of images. In addition, in example embodiments, a collection of 3D point cloud data points may be captured by a LiDAR provided, for example, on an exterior of the vehicle. The 3D point cloud data may also correspond to the scene captured by the 2D image data. A 3D point cloud representation of the scene may be constructed using the set of 3D point cloud data points.

A rigid transformation may then be determined between the 3D representation of the scene constructed from the 2D image data and the 3D point cloud representation of the scene. The rigid transformation may be embodied as a transformation matrix that includes both rotational and translational components that provide a best match between the 3D representation of the scene and the 3D point cloud representation of the scene. The camera and the LiDAR can then be aligned/calibrated with respect to one another based at least in part on the determined rigid transformation.

In addition, in example embodiments, a scaling factor may be determined between the 3D representation of the scene constructed from the 2D image data and the 3D point cloud representation of the scene. The scaling factor may represent a ratio between an actual distance between objects (or portions of an object) present in the captured scene and a relative distance between the objects (or portions of the object) in the 3D representation of the scene constructed from the 2D image data. In example embodiments, the sensor alignment/calibration may be performed further based on the determined scaling factor.

By utilizing sensor data captured by vehicle sensors during vehicle operation to align/calibrate the vehicle sensors in accordance with example embodiments of the invention, the sensor alignment/calibration can be achieved in a more efficient and less time-intensive manner. In particular, the alignment/calibration of different vehicle sensors can be performed simultaneously with vehicle operation without requiring separate and distinct data collection solely for calibration purposes. As such, example embodiments of the invention provide a technical solution that represents a technological improvement over conventional sensor alignment/calibration techniques.

FIG. 1 is an aerial view of a sensor assembly 104 in accordance with an example embodiment of the invention. The sensor assembly 104 may include a variety of different types of sensors including, for example, one or more LiDAR sensors 108 and one or more cameras 106. Although not depicted in FIG. 1, the sensor assembly 104 may further include other types of sensors such as, for example, one or more IMUs, one or more GPS receivers, and so forth. In the example configuration depicted in FIG. 1, the LiDAR sensor 108 is centrally located on a roof of a vehicle 102 and is surrounded by multiple cameras that are positioned circumferentially around the LiDAR sensor 108. In example embodiments, the LiDAR sensor 108 may periodically rotate through a scan path during which the LiDAR 108 may illuminate objects in the scanned environment with pulses of light and measure the differences in flight times and wavelengths for light that is reflected back to detect the presence of target objects, determine distances between the vehicle 102 and the target objects, determine distances between various target objects, and the like. The LiDAR 108 may exhibit a horizontal scan path and/or a vertical scan path.

In example embodiments, as the LiDAR 108 travels through its scan path, it may become aligned with each camera 106 of the sensor assembly at a respective particular point in time. Determining an alignment between each camera 106 and the LiDAR 108 would allow the image data captured by the cameras 106 to be matched (e.g., fused) with the LiDAR scan data to facilitate a variety of autonomous vehicle processing tasks, such as object recognition, for example. Described herein are techniques for performing an alignment/calibration of the LiDAR 108 to a camera 106 using respective data captured by each sensor.

Figure 2A:
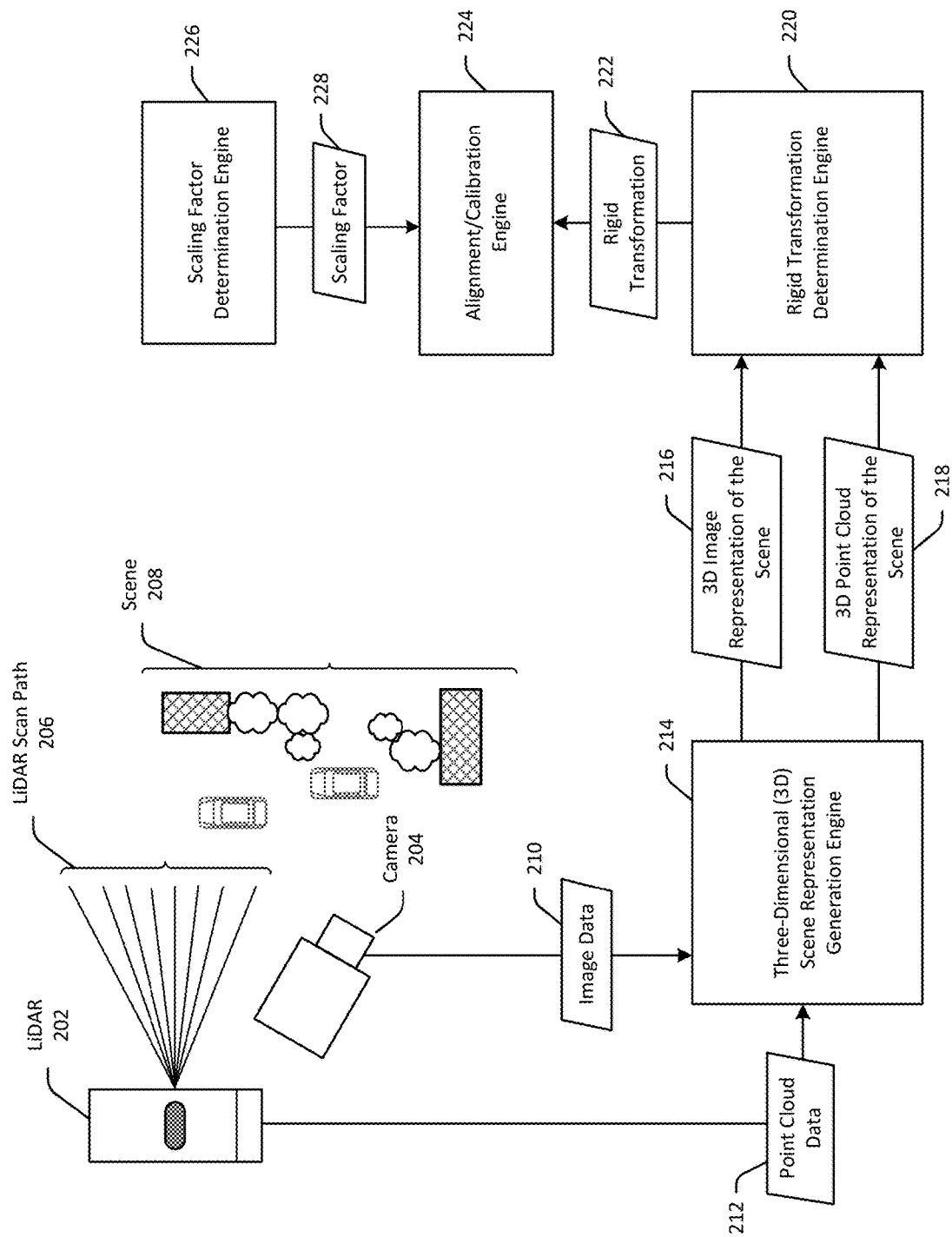
FIG. 2A schematically illustrates alignment/calibration of a LiDAR with respect to a camera in accordance with an example embodiment of the invention.
Figure 2B:
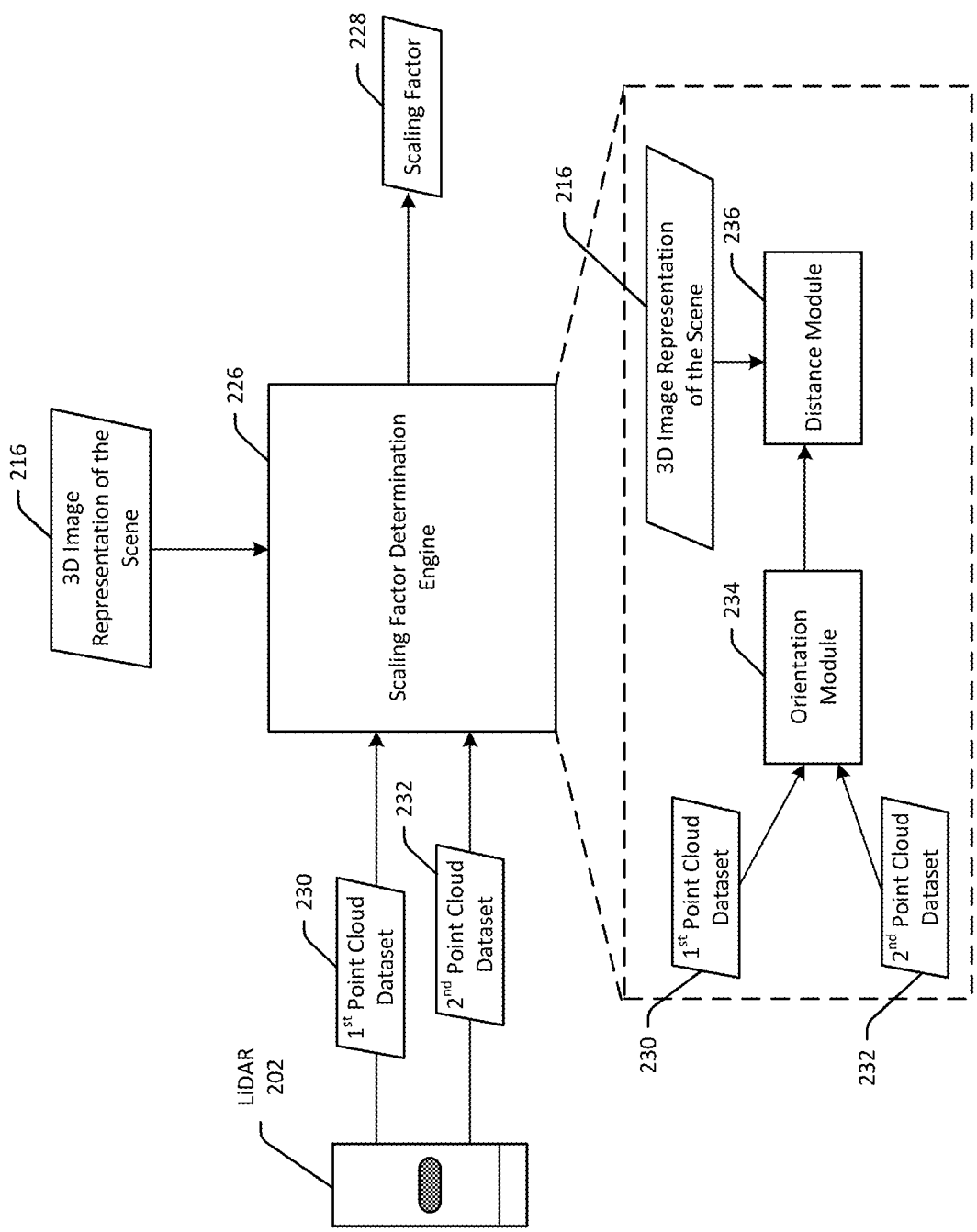
FIG. 2B schematically illustrates in more detail generating of a scaling factor used, at least in part, to perform the alignment/calibration illustrated in FIG. 2A in accordance with an example embodiment of the invention.
Figure 3:
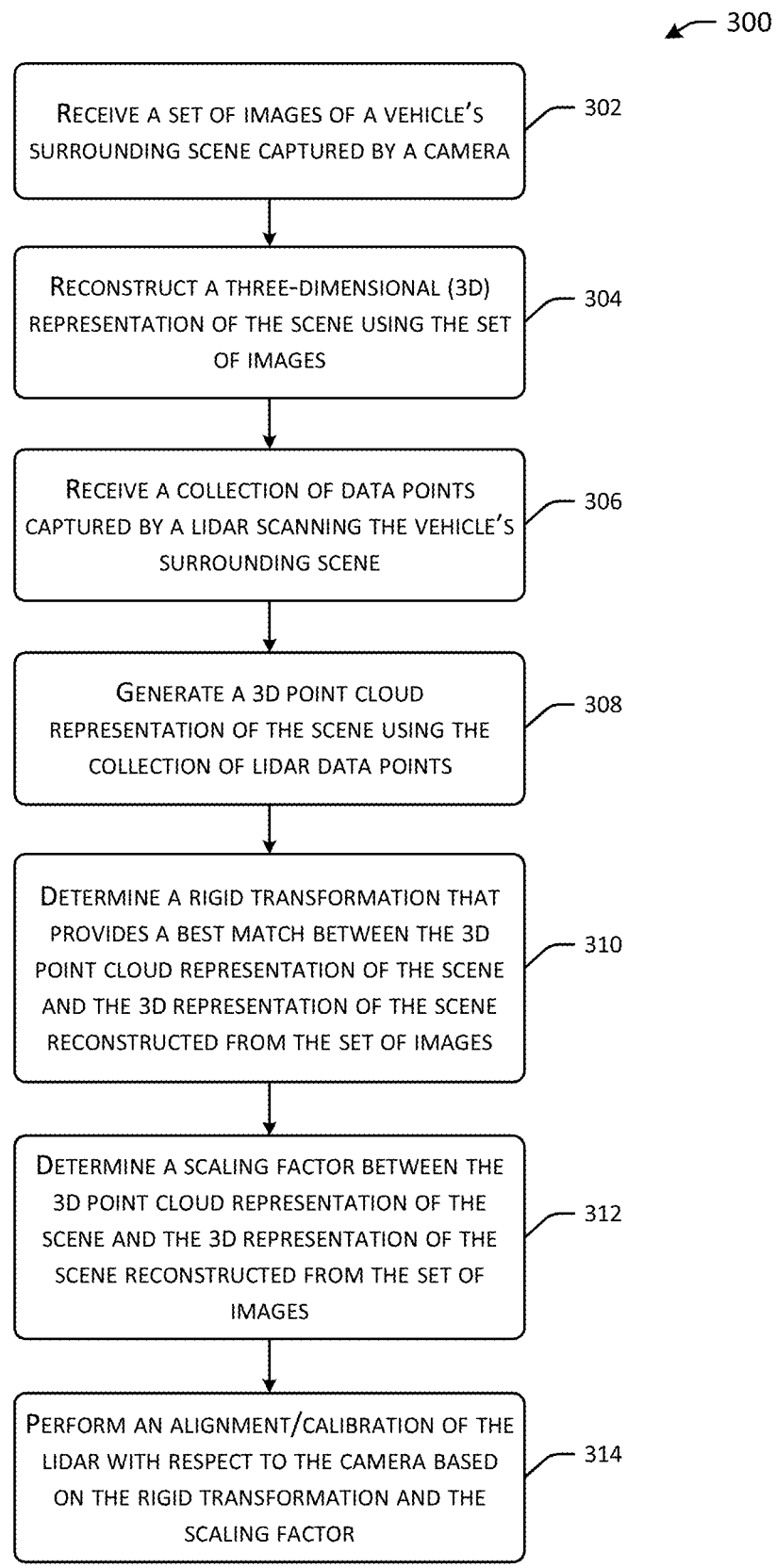
FIG. 3 is a process flow diagram of an illustrative method for aligning/calibrating a LiDAR with respect to a camera in accordance with an example embodiment of the invention.
Figure 4:
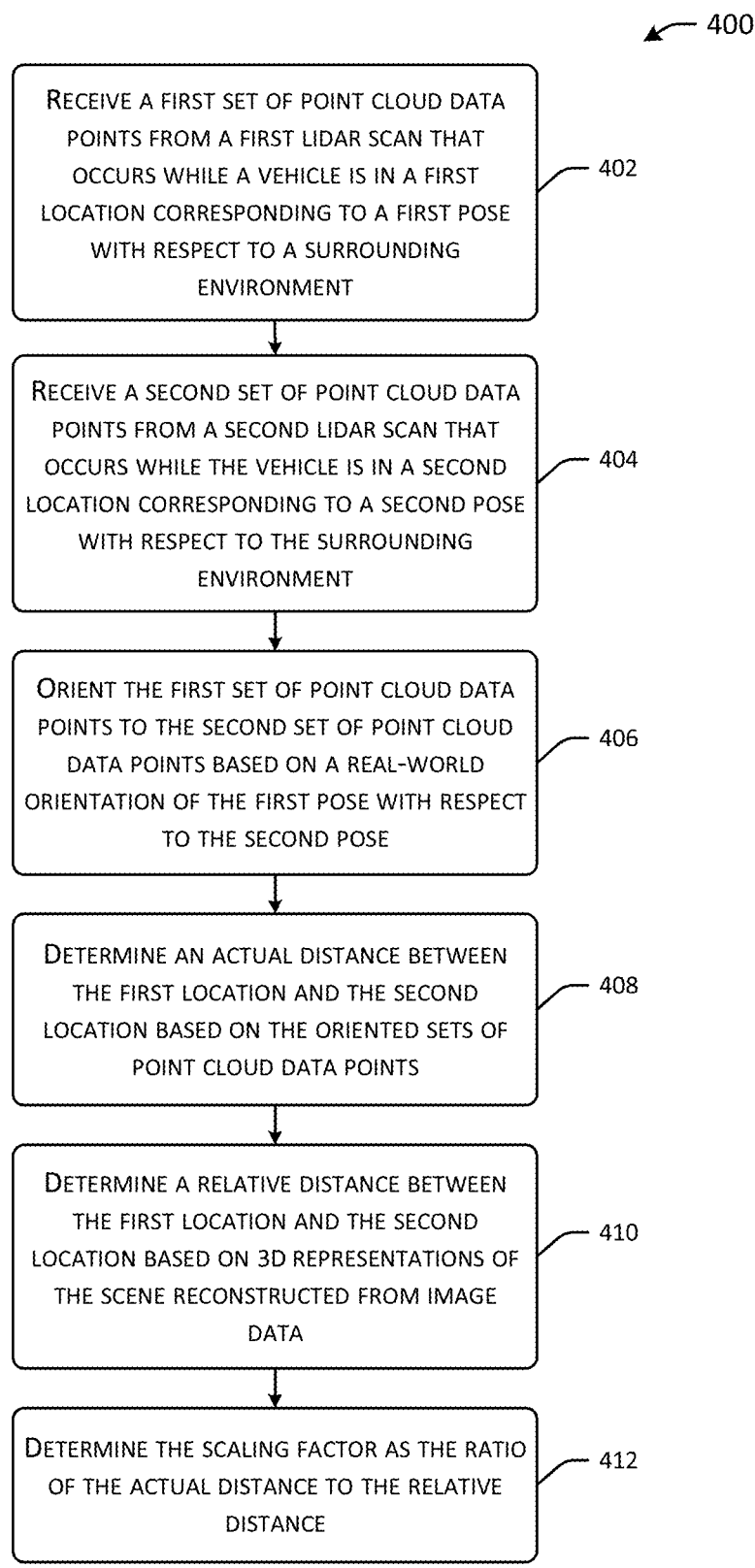
FIG. 4 is a process flow diagram of an illustrative method for determining a scaling factor that is used, at least in part, to align/calibrate a LiDAR with respect to a camera in accordance with an example embodiment of the invention.

FIG. 2A schematically illustrates alignment/calibration of a LiDAR with respect to a camera in accordance with an example embodiment of the invention. FIG. 3 is a process flow diagram of an illustrative method 300 for aligning/calibrating a LiDAR with respect to a camera in accordance with an example embodiment of the invention. FIG. 3 will be described in conjunction with FIG. 2A hereinafter. FIG. 2B schematically illustrates in more detail determination of a scaling factor used, at least in part, to perform the alignment/calibration illustrated in FIG. 2A in accordance with an example embodiment of the invention. FIG. 4 is a process flow diagram of an illustrative method 400 for determining a scaling factor that is used, at least in part, to align/calibrate a LiDAR with respect to a camera in accordance with an example embodiment of the invention. FIG. 4 will be described in conjunction with FIG. 2B later in this disclosure.

Each operation of the method 300 and/or the method 400 can be performed by one or more of the engines/program modules depicted in FIG. 2A, 2B, or 5, whose operation will be described in more detail hereinafter. These engines/program modules can be implemented in any combination of hardware, software, and/or firmware. In certain example embodiments, one or more of these engines/program modules can be implemented, at least in part, as software and/or firmware modules that include computer-executable instructions that when executed by a processing circuit cause one or more operations to be performed. In example embodiments, these engines/program modules may be customized computer-executable logic implemented within a customized computing machine such as a customized FPGA or ASIC. A system or device described herein as being configured to implement example embodiments of the invention can include one or more processing circuits, each of which can include one or more processing units or cores. Computer-executable instructions can include computer-executable program code that when executed by a processing core can cause input data contained in or referenced by the computer-executable program code to be accessed and processed by the processing core to yield output data.

Referring first to FIG. 3 in conjunction with FIG. 2A, at block 302 of the method 300, a 3D scene representation generation engine 214 may receive image data 210 captured by a camera 204. The camera 204 may be a particular implementation of a camera 106 depicted in FIG. 1. While example embodiments are described herein with respect to aligning a first vehicle sensor (e.g., the camera 204) with a LiDAR 202 (which may be a particular implementation of the LiDAR 108 depicted in FIG. 1), it should be appreciated that techniques described herein can be used to align/calibrate the LiDAR 202 with any number of cameras 204.

In an example embodiment, the image data 210 received at block 302 may include a set of images of a scene 208 captured by the camera 204 of an environment surrounding a vehicle as the vehicle is traversing the environment. The set of images may be captured from different camera poses as the vehicle traverses the environment. That is, even though the camera 204 may be fixedly mounted to the vehicle, as the vehicle maneuvers through the environment, the camera 204 may capture the image data 210 from a variety of different camera poses.

At block 304 of the method 300, the 3D scene representation generation engine 214 may construct a 3D image representation of the scene 216 using the set of images contained in the image data 210. In some example embodiments, the 3D image representation of the scene 216 may be constructed by stitching together images in the set of images that are captured from different camera poses. The images may be stitched together based on the real-world orientation of the camera poses to produce the 3D image representation of the scene 216.

At block 306 of the method 300, the 3D scene representation generation engine 214 may receive point cloud data 212 from the LiDAR 202. In example embodiments, the point cloud data 212 may include a collection of data points captured by LiDAR 206 during one or more scan paths 206. In example embodiments, the collection of 3D LiDAR data points may be representative of the scene 208 captured by the LiDAR's scan paths 206 as the vehicle traverses the environment.

At block 308 of the method 300, the 3D scene representation generation engine 214 may generate a 3D point cloud representation of the scene 218 using the collection of LiDAR data points. The 3D point cloud representation of the scene 218 may include sets of LiDAR data points captured during different scan paths of the LiDAR 202 at orientations with respect to the scene 208 within the environment being traversed by the vehicle. While the LiDAR data points from a single scan of the LiDAR 202 may be a 3D collection of data points, they may not fully represent the 3D scene 208 being captured. As such, the engine 214 may construct a full 3D representation of the scene 218 using 3D LiDAR data points captured from multiple LiDAR scans.

At block 310 of the method 300, a rigid transformation determination engine 220 may determine a rigid transformation 222 that provides a best match between the 3D image representation of the scene 216 and the 3D point cloud representation of the scene 218. In some example embodiments, the rigid transformation may be a transformation matrix that includes rotational and translational components that define a transformation from a coordinate system of the LiDAR 202 to a coordinate system of the camera 206, and vice versa. In example embodiments, the rigid transformation 222 can be used align/calibrate the LiDAR 202 and the camera 206 such that 3D point cloud data generated by the LiDAR 202 can be oriented in the real-world with image data captured by the camera 206, thereby allowing the 2D image data and the 3D point cloud data to be fused.

At block 312 of the method 300, a scaling factor determination engine 226 may determine a scaling factor 228 between the 3D point cloud representation of the scene 218 and the 3D representation of the scene 216 reconstructed from the set of images contained in the image data 210. Generation of the scaling factor 228 will be described in more detail hereinafter in reference to FIGS. 2B and 4.

Finally, at block 314 of the method 300, an alignment/calibration engine 224 may perform an alignment/calibration between the LiDAR 202 and the camera 206 based at least in part on the rigid transformation 220 and the scaling factor 228. Once the LiDAR 202 and the camera 206 are aligned/calibrated with respect one another, the respective data they captured can be easily fused and used to perform various autonomous vehicle processing tasks.

The process for generating the scaling factor 228 will now be described in reference to FIGS. 2B and 4. In example embodiments, determining the scaling factor 228 may be necessary because the scale of objects contained in the 3D image representation of the scene 216 may not represent an accurate real-world scale due to the scale of the image data 210 being different from the real-world scale of objects.

Referring now to FIG. 4 in conjunction with FIG. 2B, at block 402 of the method 400, the scaling factor determination engine 226 may receive a first set of point cloud data points 230 from a first scan of the LiDAR 202. In example embodiments, the first LiDAR scan may occur while a vehicle is in a first location corresponding to a first pose of the LiDAR 202 with respect to a surrounding environment.

At block 404 of the method 400, the scaling factor determination engine 226 may receive a second set of point cloud data points 232 from a second scan of the LiDAR 202. In example embodiments, the second LiDAR scan may occur while the vehicle is in a second location corresponding to a second pose of the LiDAR 202 with respect to the surrounding environment.

At block 406 of the method 400, an orientation module 234 of the scaling factor determination engine 226 may orient the first set of point cloud data points 230 to the second set of point cloud data points 232 based on a real-world orientation of the first pose with respect to the second pose. As previously described, the first pose may correspond to a first orientation of the LiDAR 202 with respect to the sensed environment when the vehicle is at the first location. Similarly, the second pose may correspond to a second orientation of the LiDAR 202 with respect to the sensed environment when the vehicle is in the second location.

At block 408 of the method 400, a distance module 236 of the scaling factor determination engine 226 may determine an actual distance between the first location and the second location based on the oriented sets of point cloud data points. At block 410 of the method 400, the distance module 236 may determine a relative distance between the first location and the second location based at least in part on the 3D image representation of the scene 216 reconstructed from image data 210. Finally, at block 412 of the method 400, the scaling factor determination engine 226 may determine the scaling factor 228 as the ratio of the actual distance determined at block 408 to the relative distance determined at block 410. As previously described, the scaling factor 228 may then be used to in conjunction with the rigid transformation 222 to perform the alignment/calibration of the LiDAR 202 and the camera 206.

Figure 5:
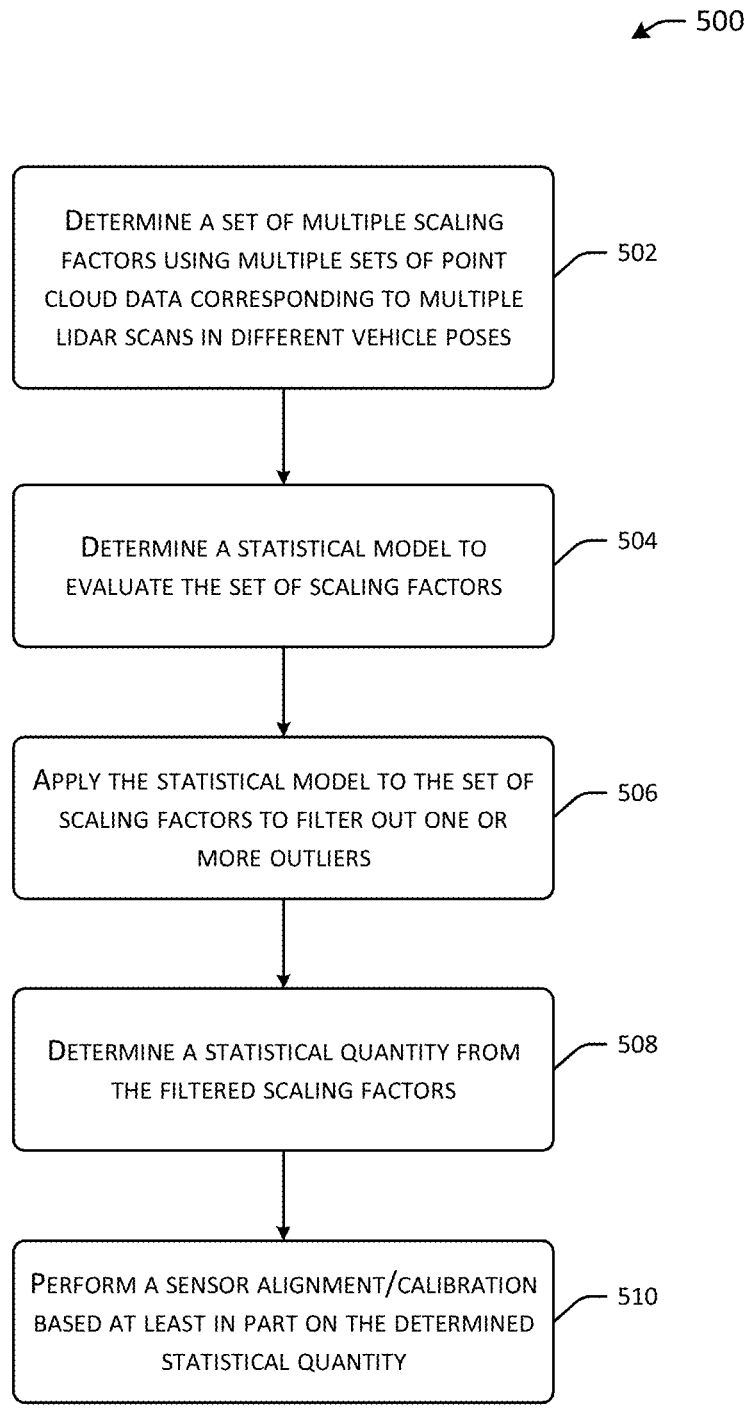
FIG. 5 is a process flow diagram of an illustrative method for utilizing a statistical processing model to determine the scaling factor in accordance with an example embodiment of the invention.

Referring now to FIG. 5, an illustrative method 500 for determining the scaling factor 228 is begins at block 502, where the scaling factor determination engine 226 determines a set of multiple scaling factors using multiple point cloud datasets. The point cloud datasets may include multiple sets of LiDAR data points corresponding to multiple LiDAR scans from different vehicle poses.

At block 504 of the method 500, the scaling factor determination engine 226 may determine a statistical model to evaluate the set of scaling factors. In some example embodiments, the statistical model may be a linear regression model. In some example embodiments, the statistical model may be based on an assumption that the set of scaling factors will have a Gaussian distribution. In some example embodiments, the statistical model may employ a Monte Carlo simulation.

At block 506 of the method 500, the scaling factor determination engine 226 may apply the determined statistical model to the set of scaling factors to thereby filter out one or more outliers from the set of scaling factors. For instance, the engine 226 may identify and filter out outliers based on an assumed Gaussian distribution for the set of scaling factors. The outliers may be identified as those points (i.e., scaling factors) that fall at least a threshold number of standard deviation(s) from a mean.

At block 508 of the method 500, engine 226 may determine a statistical quantity from the filtered scaling factors. In some example embodiments, the statistical quantity may be a mean of the scaling factors that remain after the outliers are filtered out. In other example embodiments, the statistical quantity may be the root mean squared of the set of filtered scaling factors. In yet other example embodiments, the statistical quantity may be the mode, the median, or some other statistical quantity derivable from the filtered set of scaling factors.

At block 510 of the method 500, a sensor alignment/calibration may be performed based at least in part on the determined statistical quantity. More specifically, the alignment/calibration engine 224 may align/calibrate a first vehicle sensor (e.g., the LiDAR 202) to a second vehicle sensor (e.g., the camera 204) using the rigid transformation 222 generated by the rigid transformation determination engine 220 as well as the statistical quantity determined at block 508, which can be used as scaling factor 228. It should be appreciated that in some example embodiments, a similar process as method 500 may be executed to determine the rigid transformation 222. In particular, multiple candidate rigid transformations may be determined, a statistical model may be used to filter outliers from the set of candidate rigid transformations, a statistical quantity may be determined from the filtered set of candidate rigid transformations, and the determined statistical quantity may be selected as the rigid transformation 222.

Hardware Implementation

Figure 6:
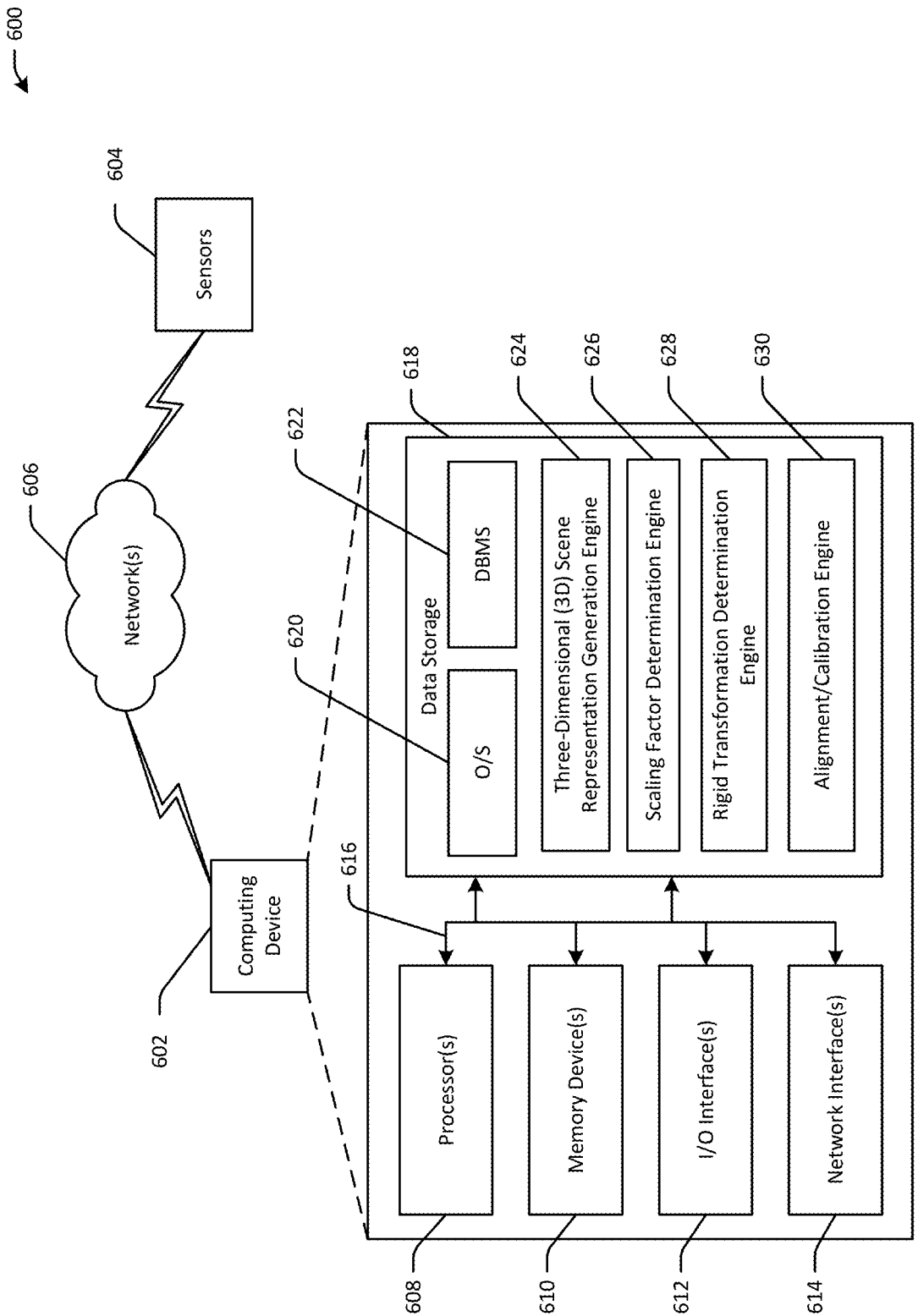
FIG. 6 is a schematic block diagram illustrating an example networked architecture configured to implement example embodiments of the invention.

FIG. 6 is a schematic block diagram illustrating an example networked architecture 600 configured to implement example embodiments of the invention. The networked architecture 600 can include one or more special-purpose computing devices 602 communicatively coupled via one or more networks 606 to various sensors 604. The sensors 604 may include any of the example types of on-board vehicle sensors previously described including, without limitation, LiDAR sensors, radars, cameras, GPS receivers, sonar-based sensors, ultrasonic sensors, IMUs, accelerometers, gyroscopes, magnetometers, FIR sensors, and so forth. In example embodiments, the sensors 604 may include on-board sensors provided on an exterior or in an interior of a vehicle such as an autonomous vehicle. The special-purpose computing device(s) 602 may include devices that are integrated with a vehicle and may receive sensor data from the sensors 604 via a local network connection (e.g., WiFi, Bluetooth, Dedicated Short Range Communication (DSRC), or the like). In other example embodiments, the special-purpose computing device(s) 602 may be provided remotely from a vehicle and may receive the sensor data from the sensors 604 via one or more long-range networks.

The special-purpose computing device(s) 602 may be hard-wired to perform the techniques; may include circuitry or digital electronic devices such as one or more ASICs or FPGAs that are persistently programmed to perform the techniques; and/or may include one or more hardware processors programmed to perform the techniques pursuant to program instructions in firmware, memory, other storage, or a combination thereof. The special-purpose computing device(s) 602 may also combine custom hard-wired logic, ASICs, or FPGAs with custom programming to accomplish the techniques. The special-purpose computing device(s) 602 may be desktop computer systems, server computer systems, portable computer systems, handheld devices, networking devices or any other device or combination of devices that incorporate hard-wired and/or programmed logic to implement the techniques.

The special-purpose computing device(s) may be generally controlled and coordinated by operating system software 620, such as IOS, Android, Chrome OS, Windows XP, Windows Vista, Windows 4, Windows 8, Windows Server, Windows CE, Unix, Linux, SunOS, Solaris, iOS, Blackberry OS, VxWorks, or other compatible operating systems. In other embodiments, the computing device(s) 602 may be controlled by a proprietary operating system. The operating system software 620 may control and schedule computer processes for execution; perform memory management; provide file system, networking, and I/O services; and provide user interface functionality, such as a graphical user interface ("GUI").

While the computing device(s) 602 and/or the sensors 604 may be described herein in the singular, it should be appreciated that multiple instances of any such component can be provided and functionality described in connection any particular component can be distributed across multiple instances of such a component. In certain example embodiments, functionality described herein in connection with any given component of the architecture 600 can be distributed among multiple components of the architecture 600. For example, at least a portion of functionality described as being provided by a computing device 602 may be distributed among multiple such computing devices 602.

The network(s) 606 can include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. The network(s) 606 can have any suitable communication range associated therewith and can include, for example, global networks (e.g., the Internet), metropolitan area networks (MANs), wide area networks (WANs), local area networks (LANs), or personal area networks (PANs). In addition, the network(s) 606 can include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the computing device 602 can include one or more processors (processor(s)) 608, one or more memory devices 610 (generically referred to herein as memory 610), one or more input/output ("I/O") interface(s) 612, one or more network interfaces 614, and data storage 618. The computing device 602 can further include one or more buses 616 that functionally couple various components of the computing device 602. The data storage may store one or more engines, program modules, components, or the like including, without limitation, a 3D scene representation generation engine 624, a scaling factor determination engine 626, a rigid transformation determination engine 628, and an alignment/calibration engine 630. Each of the engines/components depicted in FIG. 6 may include logic for performing any of the processes or tasks described earlier in connection with correspondingly named engines/components. In certain example embodiments, any of the depicted engines/components may be implemented in hard-wired circuitry within digital electronic devices such as one or more ASICs or FPGAs that are persistently programmed to perform corresponding techniques.

The bus(es) 616 can include at least one of a system bus, a memory bus, an address bus, or a message bus, and can permit the exchange of information (e.g., data (including computer-executable code), signaling, etc.) between various components of the computing device 602. The bus(es) 616 can include, without limitation, a memory bus or a memory controller, a peripheral bus, an accelerated graphics port, and so forth. The bus(es) 616 can be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 610 can include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, can include non-volatile memory. In certain example embodiments, volatile memory can enable faster read/write access than non-volatile memory. However, in certain other example embodiments, certain types of non-volatile memory (e.g., FRAM) can enable faster read/write access than certain types of volatile memory.

In various implementations, the memory 610 can include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 610 can include main memory as well as various forms of cache memory such as instruction cache(s), data cache(s), translation lookaside buffer(s) (TLBs), and so forth. Further, cache memory such as a data cache can be a multi-level cache organized as a hierarchy of one or more cache levels (L1, L2, etc.). In example embodiments, the memory 610 may include the data storage 106(1)-106(P) and/or the data storage 120 depicted in FIG. 1. Alternatively, the data storage 106(1)-106(P) may be hard disk storage forming part of the data storage 618 and/or the data storage 120 may be a form of RAM or cache memory that is provided as part of the FOV semantics computing machine 624 itself.

The data storage 618 can include removable storage and/or non-removable storage including, but not limited to, magnetic storage, optical disk storage, and/or tape storage. The data storage 618 can provide non-volatile storage of computer-executable instructions and other data. The memory 610 and the data storage 618, removable and/or non-removable, are examples of computer-readable storage media (CRSM) as that term is used herein. The data storage 618 can store computer-executable code, instructions, or the like that can be loadable into the memory 610 and executable by the processor(s) 608 to cause the processor(s) 608 to perform or initiate various operations. The data storage 618 can additionally store data that can be copied to memory 610 for use by the processor(s) 608 during the execution of the computer-executable instructions. Moreover, output data generated as a result of execution of the computer-executable instructions by the processor(s) 608 can be stored initially in memory 610 and can ultimately be copied to data storage 618 for non-volatile storage.

More specifically, the data storage 618 can store one or more operating systems (O/S) 620 and one or more database management systems (DBMS) 622 configured to access the memory 610 and/or one or more external datastore(s) (not depicted) potentially via one or more of the networks 606. In addition, the data storage 618 may further store one or more program modules, applications, engines, computer-executable code, scripts, or the like. For instance, any of the engines/components depicted in FIG. 6 may be implemented as software and/or firmware that includes computer-executable instructions (e.g., computer-executable program code) loadable into the memory 610 for execution by one or more of the processor(s) 608 to perform any of the techniques described herein.

Although not depicted in FIG. 6, the data storage 618 can further store various types of data utilized by engines/components of the computing device 602. Such data may include, without limitation, sensor data, feedback data including historical sensor operational data, initial parameter data, or the like. Any data stored in the data storage 618 can be loaded into the memory 610 for use by the processor(s) 608 in executing computer-executable program code. In addition, any data stored in the data storage 618 can potentially be stored in one or more external datastores that are accessible via the DBMS 622 and loadable into the memory 610 for use by the processor(s) 608 in executing computer-executable instructions/program code.

The processor(s) 608 can be configured to access the memory 610 and execute computer-executable instructions/program code loaded therein. For example, the processor(s) 608 can be configured to execute computer-executable instructions/program code of the various engines/components of the FOV semantics computing machine 624 to cause or facilitate various operations to be performed in accordance with one or more embodiments of the invention. The processor(s) 608 can include any suitable processing unit capable of accepting data as input, processing the input data in accordance with stored computer-executable instructions, and generating output data. The processor(s) 608 can include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 608 can have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 608 can be made capable of supporting any of a variety of instruction sets.

Referring now to other illustrative components depicted as being stored in the data storage 618, the O/S 620 can be loaded from the data storage 618 into the memory 610 and can provide an interface between other application software executing on the computing device 602 and hardware resources of the computing device 602. More specifically, the O/S 620 can include a set of computer-executable instructions for managing hardware resources of the computing device 602 and for providing common services to other application programs. In certain example embodiments, the O/S 620 can include or otherwise control execution of one or more of the engines/program modules stored in the data storage 618. The O/S 620 can include any operating system now known or which can be developed in the future including, but not limited to, any server operating system, any mainframe operating system, or any other proprietary or non-proprietary operating system.

The DBMS 622 can be loaded into the memory 610 and can support functionality for accessing, retrieving, storing, and/or manipulating data stored in the memory 610, data stored in the data storage 618, and/or data stored in external datastore(s). The DBMS 622 can use any of a variety of database models (e.g., relational model, object model, etc.) and can support any of a variety of query languages. The DBMS 622 can access data represented in one or more data schemas and stored in any suitable data repository. Datastore(s) that may be accessible by the computing device 602 via the DBMS 622, can include, but are not limited to, databases (e.g., relational, object-oriented, etc.), file systems, flat files, distributed datastores in which data is stored on more than one node of a computer network, peer-to-peer network datastores, or the like.

Referring now to other illustrative components of the computing device 602, the input/output (I/O) interface(s) 612 can facilitate the receipt of input information by the computing device 602 from one or more I/O devices as well as the output of information from the computing device 602 to the one or more I/O devices. The I/O devices can include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components can be integrated into the computing device 602 or can be separate therefrom. The I/O devices can further include, for example, any number of peripheral devices such as data storage devices, printing devices, and so forth.

The I/O interface(s) 612 can also include an interface for an external peripheral device connection such as universal serial bus (USB), FireWire, Thunderbolt, Ethernet port or other connection protocol that can connect to one or more networks. The I/O interface(s) 612 can also include a connection to one or more antennas to connect to one or more networks via a wireless local area network (WLAN) (such as Wi-Fi) radio, Bluetooth, and/or a wireless network radio, such as a radio capable of communication with a wireless communication network such as a Long Term Evolution (LTE) network, WiMAX network, 3G network, etc.

The computing device 602 can further include one or more network interfaces 614 via which the computing device 602 can communicate with any of a variety of other systems, platforms, networks, devices, and so forth. The network interface(s) 614 can enable communication, for example, with the sensors 604 and/or one or more other devices via one or more of the network(s) 606. In example embodiments, the network interface(s) 614 provide a two-way data communication coupling to one or more network links that are connected to one or more of the network(s) 606. For example, the network interface(s) 614 may include an integrated services digital network (ISDN) card, a cable modem, a satellite modem, or a modem to provide a data communication connection to a corresponding type of telephone line. As another non-limiting example, the network interface(s) 614 may include a local area network (LAN) card to provide a data communication connection to a compatible LAN (or a wide area network (WAN) component to communicate with a WAN). Wireless links may also be implemented. In any such implementation, the network interface(s) 614 may send and receive electrical, electromagnetic, or optical signals that carry digital data streams representing various types of information.

A network link typically provides data communication through one or more networks to other data devices. For example, a network link may provide a connection through a local network to a host computer or to data equipment operated by an Internet Service Provider (ISP). The ISP, in turn, may provide data communication services through the world wide packet data communication network now commonly referred to as the "Internet". Local networks and the Internet both use electrical, electromagnetic, or optical signals that carry digital data streams. The signals through the various network(s) 604 and the signals on network links and through the network interface(s) 614, which carry the digital data to and from the computing device 602, are example forms of transmission media. In example embodiments, the computing device 602 can send messages and receive data, including program code, through the network(s) 606, network links, and network interface(s) 614. For instance, in the Internet example, a server might transmit a requested code for an application program through the Internet, the ISP, a local network, and a network interface 614. The received code may be executed by a processor 608 as it is received, and/or stored in the data storage 618, or other non-volatile storage for later execution.

It should be appreciated that the engines depicted in FIG. 6 as part of the computing device 602 are merely illustrative and not exhaustive. In particular, functionality can be modularized in any suitable manner such that processing described as being supported by any particular engine can alternatively be distributed across multiple engines, program modules, components, or the like, or performed by a different engine, program module, component, or the like. Further, one or more depicted engines may or may not be present in certain embodiments, while in other embodiments, additional engines not depicted can be present and can support at least a portion of the described functionality and/or additional functionality. In addition, various engine(s), program module(s), script(s), plug-in(s), Application Programming Interface(s) (API(s)), or any other suitable computer-executable code hosted locally on the computing device 602 and/or hosted on other computing device(s) (e.g., 602) accessible via one or more of the network(s) 602, can be provided to support functionality provided by the engines depicted in FIG. 6 and/or additional or alternate functionality. In addition, engines that support functionality described herein can be implemented, at least partially, in hardware and/or firmware and can be executable across any number of computing devices 602 in accordance with any suitable computing model such as, for example, a client-server model, a peer-to-peer model, and so forth.

It should further be appreciated that the computing device 602 can include alternate and/or additional hardware, software, and/or firmware components beyond those described or depicted without departing from the scope of the invention. More particularly, it should be appreciated that software, firmware, and/or hardware components depicted as forming part of the computing device 602 are merely illustrative and that some components may or may not be present or additional components may be provided in various embodiments. It should further be appreciated that each of the engines depicted and described represent, in various embodiments, a logical partitioning of supported functionality. This logical partitioning is depicted for ease of explanation of the functionality and may or may not be representative of the structure of software, hardware, and/or firmware for implementing the functionality.

In general, the terms engine, program module, or the like, as used herein, refer to logic embodied in hardware, firmware, and/or circuitry, or to a collection of software instructions, possibly having entry and exit points, written in a programming language, such as, for example, Java, C or C++. A software engine/module may be compiled and linked into an executable program, installed in a dynamic link library, or may be written in an interpreted programming language such as, for example, BASIC, Perl, or Python. It will be appreciated that software engines/modules may be callable from other engines/modules or from themselves, and/or may be invoked in response to detected events or interrupts. Software engines/modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. "Open source" software refers to source code that can be distributed as source code and/or in compiled form, with a well-publicized and indexed means of obtaining the source, and optionally with a license that allows modifications and derived works. Software instructions may be embedded in firmware and stored, for example, on flash memory such as erasable programmable read-only memory (EPROM). It will be further appreciated that hardware modules/engines may include connected logic units, such as gates and flip-flops, and/or may be further include programmable units, such as programmable gate arrays or processors.

Example embodiments are described herein as including engines or program modules. Such engines/program modules may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a field programmable gate array (FPGA) or an application specific integrated circuit (ASIC). A hardware engine may also include programmable logic or circuitry that is temporarily configured by software to perform certain operations. For example, a hardware engine may include a general-purpose processor or other programmable processor configured by software, in which case, the configured processor becomes a specific machine uniquely tailored to perform the configured functions and no longer constitute general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the term "engine" or "program module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware engines are temporarily configured (e.g., programmed), each of the hardware engines need not be configured or instantiated at any one instance in time. For example, where a hardware engine includes a general-purpose processor configured by software to become a special-purpose processor, the general-purpose processor may be configured as respectively different special-purpose processors (e.g., comprising different hardware engines) at different times. Software accordingly can configure a particular processor or processors, for example, to constitute a particular hardware engine at a given instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute an implementation of a hardware engine. Similarly, the methods described herein may be at least partially processor-implemented, with a particular processor or processors being an example of hardware. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations of example methods described herein may be distributed among multiple processors, not only residing within a single machine, but deployed across a number of machines. In some example embodiments, the processors may be located in a single geographic location (e.g., within a home environment, an office environment, or a server farm). In other example embodiments, the processors may be distributed across a number of geographic locations.

The present invention may be implemented as a system, a method, and/or a computer program product. The computer program product may include a computer readable storage medium (or media) having computer readable program instructions embodied thereon for causing a processor to carry out aspects of the present invention.

The computer readable storage medium is a form of non-transitory media, as that term is used herein, and can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. The computer readable storage medium, and non-transitory media more generally, may include non-volatile media and/or volatile media. A non-exhaustive list of more specific examples of a computer readable storage medium includes the following: a portable computer diskette such as a floppy disk or a flexible disk; a hard disk; a random access memory (RAM), a read-only memory (ROM), an erasable programmable read-only memory (EPROM or Flash memory), a static random access memory (SRAM), or any other memory chip or cartridge; a portable compact disc read-only memory (CD-ROM); a digital versatile disk (DVD); a memory stick; a solid state drive; magnetic tape or any other magnetic data storage medium; a mechanically encoded device such as punch-cards or raised structures in a groove having instructions recorded thereon or any physical medium with patterns of holes; any networked versions of the same; and any suitable combination of the foregoing.

Non-transitory media is distinct from transmission media, and thus, a computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Non-transitory media, however, can operate in conjunction with transmission media. In particular, transmission media may participate in transferring information between non-transitory media. For example, transmission media can include coaxial cables, copper wire, and/or fiber optics, including the wires that include at least some of the bus(es) 602. Transmission media can also take the form of acoustic or light waves, such as those generated during radio-wave and infra-red data communications.

Computer readable program instructions described herein can be downloaded to respective computing/processing devices from a computer readable storage medium or to an external computer or external storage device via a network, for example, the Internet, a local area network (LAN), a wide area network (WAN), and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider (ISP)). In some embodiments, electronic circuitry including, for example, programmable logic circuitry, FPGAs, or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The various features and processes described above may be used independently of one another or may be combined in various ways. All possible combinations and sub-combinations are intended to fall within the scope of the invention. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

The flowchart and block diagrams in the Figures illustrate the architecture, functionality, and operation of possible implementations of systems, methods, and computer program products according to various embodiments of the invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed partially, substantially, or entirely concurrently, or the blocks may sometimes be executed in the reverse order, depending upon the functionality involved.

It should be emphasized that many variations and modifications may be made to the above-described embodiments, the elements of which are to be understood as being among other example embodiments of the invention. All such modifications and variations are intended to be included herein within the scope of the invention. While example embodiments of the invention may be referred to herein, individually or collectively, by the term "invention," this is merely for convenience and does not limit the scope of the invention to any single disclosure or concept if more than one is, in fact, disclosed. The foregoing description details certain embodiments of the invention. It will be appreciated, however, that no matter how detailed the foregoing appears in text, the invention can be practiced in many ways. It should be noted that the use of particular terminology when describing certain features or aspects of the invention should not be taken to imply that the terminology is being re-defined herein to be restricted to including any specific characteristics of the features or aspects of the invention with which that terminology is associated.

The embodiments illustrated herein are described in sufficient detail to enable those skilled in the art to practice the teachings disclosed. Other embodiments may be used and derived therefrom, such that structural and logical substitutions and changes may be made without departing from the scope of the invention. The Detailed Description, therefore, is not to be taken in a limiting sense, and the scope of various embodiments is defined only by the appended claims, along with the full range of equivalents to which such claims are entitled.

Although the invention(s) have been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

As used herein, the term "or" may be construed in either an inclusive or exclusive sense. Moreover, plural instances may be provided for resources, operations, or structures described herein as a single instance. Additionally, boundaries between various resources, operations, program modules, engines, and/or datastores are somewhat arbitrary, and particular operations are illustrated in a context of specific illustrative configurations. Other allocations of functionality are envisioned and may fall within a scope of various embodiments of the invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the invention as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. In addition, it should be appreciated that any operation, element, component, data, or the like described herein as being based on another operation, element, component, data, or the like can be additionally based on one or more other operations, elements, components, data, or the like. Accordingly, the phrase "based on," or variants thereof, should be interpreted as "based at least in part on."

What is claimed is:

1. A computer-implemented method for performing an alignment between a first vehicle sensor and a second vehicle sensor, the method comprising:
   receiving two-dimensional (2D) data captured by the first vehicle sensor, the 2D data indicative of a scene within an environment being traversed by a vehicle;
   constructing a three-dimensional (3D) representation of the scene based at least in part on the 2D data;
   receiving 3D point cloud data captured by the second vehicle sensor, the 3D point cloud data indicative of the scene;
   constructing a 3D point cloud representation of the scene based at least in part on the 3D point cloud data;
   determining a scaling factor between the 3D representation of the scene and the 3D point cloud representation of the scene, wherein the determining of the scaling factor is based on a linear regression model, a Gaussian distribution, or a Monte Carlo simulation, wherein the determining of the scaling factor comprises filtering out one or more outliers from a set of scaling factors based on the linear regression model, the Gaussian distribution, or the Monte Carlo simulation; and
   performing the alignment between the first vehicle sensor and the second vehicle sensor based at least in part on the determined scaling factor.

2. The computer-implemented method of claim 1, further comprising,
   in response to filtering out one or more outliers, determining a statistical quantity; and
   performing the alignment based on the determined statistical quantity.

3. The computer-implemented method of claim 2, wherein the statistical quantity comprises a mean, median, or a mode.

4. The computer-implemented method of claim 1, wherein the performing of the alignment is further based on a determination of a rigid transformation selected from candidate rigid transformations.

5. The computer-implemented method of claim 4, further comprising filtering outliers from the candidate rigid transformations.

6. The computer-implemented method of claim 2, wherein the determining of the scaling factor is based on an assumption of the set of the scaling factors being based on a Gaussian distribution.

7. A system for performing an alignment between a first vehicle sensor and a second vehicle sensor, the system comprising:
   at least one processor; and
   at least one memory storing computer-executable instructions, wherein the at least one processor is configured to access the at least one memory and execute the computer-executable instructions to:
   receive two-dimensional (2D) data captured by the first vehicle sensor, the 2D data indicative of a scene within an environment being traversed by a vehicle;
   construct a three-dimensional (3D) representation of the scene based at least in part on the 2D data;
   receive 3D point cloud data captured by the second vehicle sensor, the 3D point cloud data indicative of the scene;
   construct a 3D point cloud representation of the scene based at least in part on the 3D point cloud data;
   determine a scaling factor between the 3D representation of the scene and the 3D point cloud representation of the scene, wherein the determining of the scaling factor is based on a linear regression model, a Gaussian distribution, or a Monte Carlo simulation, wherein the determining of the scaling factor comprises filtering out one or more outliers from a set of scaling factors based on the linear regression model, the Gaussian distribution, or the Monte Carlo simulation; and
   perform the alignment between the first vehicle sensor and the second vehicle sensor based at least in part on the determined scaling factor.

8. The system of claim 7, wherein the at least one processor is configured to, in response to filtering out one or more outliers, determine a statistical quantity; and perform the alignment based on the determined statistical quantity.

9. The system of claim 8, wherein the statistical quantity comprises a mean, median, or a mode.

10. The system of claim 7, wherein the performing of the alignment is further based on a determination of a rigid transformation selected from candidate rigid transformations.

11. The system of claim 10, wherein the at least one processor is configured to filter outliers from the candidate rigid transformations.

12. The system of claim 7, wherein the determining of the scaling factor is based on an assumption of the set of the scaling factors being based on a Gaussian distribution.

13. A computer program product for performing an alignment between a first vehicle sensor and a second vehicle sensor, the computer program product comprising a non-transitory computer-readable medium storing computer-executable instructions that, responsive to execution by a processing circuit cause a method to be performed, the method comprising:

receiving two-dimensional (2D) data captured by the first vehicle sensor, the 2D data indicative of a scene within an environment being traversed by a vehicle;

constructing a three-dimensional (3D) representation of the scene based at least in part on the 2D data;

receiving 3D point cloud data captured by the second vehicle sensor, the 3D point cloud data indicative of the scene;

constructing a 3D point cloud representation of the scene based at least in part on the 3D point cloud data;

determining a scaling factor between the 3D representation of the scene and the 3D point cloud representation of the scene, wherein the determining of the scaling factor is based on a linear regression model, a Gaussian distribution, or a Monte Carlo simulation, wherein the determining of the scaling factor comprises filtering out one or more outliers from a set of scaling factors based on the linear regression model, the Gaussian distribution, or the Monte Carlo simulation; and performing the alignment between the first vehicle sensor and the second vehicle sensor based at least in part on the determined scaling factor.

14. The computer program product of claim 13, wherein the method comprises, in response to filtering out one or more outliers, determining a statistical quantity; and performing the alignment based on the determined statistical quantity.

15. The computer program product of claim 14, wherein the statistical quantity comprises a mean, median, or a mode.

16. The computer program product of claim 13, wherein the performing of the alignment is further based on a determination of a rigid transformation selected from candidate rigid transformations.

17. The computer program product of claim 16, wherein the method comprises, filtering outliers from the candidate rigid transformations.

* * * * *